(12) United States Patent
Bodtländer

(10) Patent No.: US 8,413,799 B2
(45) Date of Patent: Apr. 9, 2013

(54) CONTAINER CLAMP OR CONTAINER CLIP

(75) Inventor: Renate Bodtländer, Guldental (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/124,144

(22) PCT Filed: Dec. 11, 2009

(86) PCT No.: PCT/EP2009/008896
§ 371 (c)(1),
(2), (4) Date: Apr. 14, 2011

(87) PCT Pub. No.: WO2010/081512
PCT Pub. Date: Jul. 22, 2010

(65) Prior Publication Data
US 2011/0197995 A1 Aug. 18, 2011

(30) Foreign Application Priority Data

Jan. 15, 2009 (DE) .......................... 10 2009 005 151

(51) Int. Cl.
*B65G 47/84* (2006.01)

(52) U.S. Cl. ........... 198/867.02; 198/867.05; 198/470.1; 198/478.1

(58) Field of Classification Search ................ 198/459.2, 198/465.1, 468.2, 470.1, 478.1, 867.02–867.09
See application file for complete search history.

(56) References Cited

U.S. PATENT DOCUMENTS

| | | | | |
|---|---|---|---|---|
| 4,172,514 A | * | 10/1979 | Shantz et al. | 198/470.1 |
| 5,337,887 A | * | 8/1994 | Greenwell et al. | 198/867.14 |
| 5,743,377 A | * | 4/1998 | Kronseder | 198/803.9 |
| 6,557,695 B2 | * | 5/2003 | Gerber et al. | 198/473.1 |
| 7,661,522 B2 | | 2/2010 | Hausladen | |
| 7,743,907 B2 | | 6/2010 | Weinbrenner et al. | |
| 8,020,690 B2 | * | 9/2011 | Asma | 198/470.1 |
| 2005/0011730 A1 | * | 1/2005 | Wittmann et al. | 198/470.1 |
| 2009/0095370 A1 | * | 4/2009 | Krulitsch | 141/6 |
| 2009/0183798 A1 | | 7/2009 | Till et al. | |
| 2011/0290622 A1 | * | 12/2011 | Suther | 198/867.11 |

FOREIGN PATENT DOCUMENTS

| | | |
|---|---|---|
| DE | 202005002470 | 11/2005 |
| DE | 102005032175 | 1/2007 |
| DE | 202006004641 | 8/2007 |
| DE | 102006017706 | 10/2007 |
| DE | 102006033512 | 1/2008 |
| DE | 202006018379 | 1/2008 |
| EP | 1999048 | 12/2008 |
| WO | 03/068643 | 8/2003 |

* cited by examiner

*Primary Examiner* — Mark A Deuble
(74) *Attorney, Agent, or Firm* — Occhiuti Rohlicek & Tsao LLP

(57) ABSTRACT

The invention relates to a container clamp (2) or container clip provided on conveying elements in container filling installations for receiving the neck of a container, particularly a bottle, each clamp (2) or clip comprising a bearing block (3). The aim of the invention is to protect such installations by special clamping designs so that improper strain would result in the failure of only a single clamp and any further damage to the installations could be avoided. Said aim is achieved in that the bearing block (3) comprises holding elements (8, 9) which detach at least partially from the bearing and holding device (10, 11) when a lateral pivoting range or a lateral force is exceeded, wherein the bearing block (3) or the container clamp (2) or container clip is released to fall on the ground.

17 Claims, 2 Drawing Sheets

CONTAINER CLAMP OR CONTAINER CLIP

CROSS-REFERENCE TO RELATED APPLICATIONS

Figure 1:
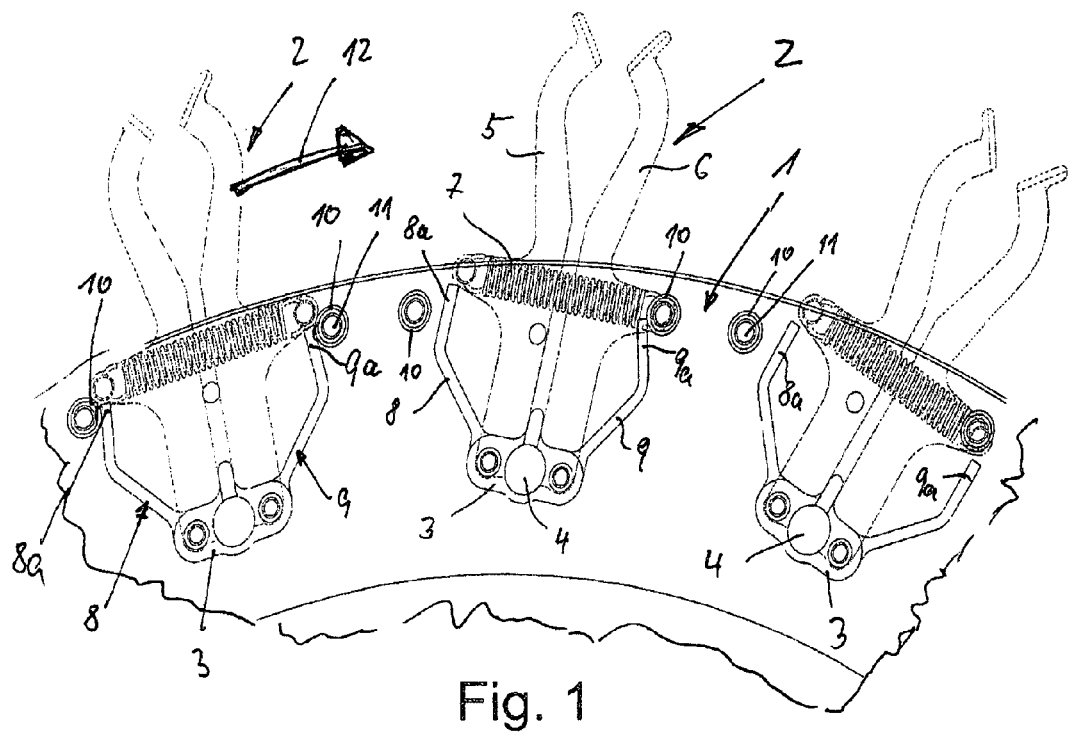

This application is the National Stage of International Application No. PCT/EP2009/008896, filed on Dec. 11, 2009, which claims the priority of German Patent Application No. 10 2009 005 151.1, filed on Jan. 15, 2009. The contents of both applications are hereby incorporated by reference in their entirety.

The invention relates to a container clamp or container clip on conveying elements in container filling installations for receiving the neck of a container of the type indicated in the preamble of claim 1.

Container clamps in such container filling systems are known in very different design embodiments, whether as passive gripper elements or as active clamps for example to grip a neck of PET bottles, the invention not being confined to this particular application. The DE 10 2005 032 175 A1, DE 20 2005 002 470 U1, DE 20 2006 004 641 U1 or the DE 20 2006 018 379 U1, which exhibit a number of container clamp or clip constructions, are cited merely by way of examples of the state of the art.

There are applications wherein it is possible, with directly blocked systems for example (blower machine transfers bottles over multiple star wheels without a buffer zone into the filler), for an inexact bottle transfer to occur because of tolerances, e.g. brought about by asynchronously running star wheels. Depending on the transfer situation, forces can occur in the case of a mis-transfer which are so strong that the installation is damaged, not just that the individual grippers are destroyed, but that extensive damage can be done to the whole installation in the transfer area.

This is where the invention comes in whose object is to protect such installations with special clamping designs such that at most the failure of only a single clamp is sustained but the installation is not otherwise damaged.

With a container clamp or container clip of the type described at the outset, this object is achieved according to the invention by the bearing block of each clamp or each clip comprising holding elements which detach at least partially from the bearing and holding device when a lateral pivoting range or a lateral force is exceeded, whereby the bearing block or the container clamp or container clip is released to fall to the ground.

This protection device ensures that if there are errors in the system due either to excessive pivoting ranges or to excessive force, the individual clamp is released and is able to fall out of its holder without the whole installation being damaged.

Embodiments of the invention are given in the dependent claims. Thus for example a practicable design configuration consists in the bearing and holding device comprising at least one bearing element and at least one, in particular two, holding elements, wherein the at least one bearing element and the at least one holding element can be formed in the shape of lips or pegs.

According to the invention one of the possible embodiments of the fixing of the bearing block which comprises the container clamp or container clip is that the bearing of this block can be designed in the manner of a bayonet fitting. Because of this design it is possible that if a certain angle of rotation is exceeded, the bearing block is released in the manner of a bayonet and can for example fall down without the rest of the installation being damaged.

A very practicable embodiment of the invention consists in the bearing block being provided with moulded-on arms, each of which being attached by a fixing element to a further peg, wherein the moulded-on arms snap off through elastic deformation at a predetermined break point when a lateral pivoting range is exceeded, and release the bearing block from the peg to fall down.

A variation on the embodiment of the container clamp according to the invention consists in the length of at least the arm that is in front in the direction of motion on the bearing block being dimensioned so that under the application of a lateral pressure the arm slides past the fixing peg and springs off the fixing peg to release the block. At the same time, it is practicable if both arms are of a length that allows them to spring off the fixing peg. It is practicable for the arms on the bearing block to be formed from an elastically flexible material.

The invention provides conveying elements with container clamps which are embodied as previously described, wherein such a conveying element is characterised by being designed as a rotatively driven transport star wheel.

Other attributes, details and advantages of the invention are indicated by the following description and by reference to the drawing. This shows in FIG. 1 bottom view of a section of a star wheel with three clamps in different pivot positions, FIG. 2 a spatial representation of the section according to FIG. 1, and in FIG. 3 a spatial bottom view under the star wheel according to FIG. 2.

A star wheel generally designated as 1 of a bottle filling installation is equipped with a multiplicity of container clamps or container clips, hereafter designated as "clamp 2", with only three clamps 2 being shown in the figures.

The clamps 2 have a bearing block generally designated as 3, which can rotate on a pivot 4 that constitutes an immovable part of the star wheel 1. As well as the two clamp arms 5 and 6 which are positioned so they can pivot on the bearing block 3, and which in the illustrated examples are held together by a tension spring 7, the bearing block 3 exhibits two externally moulded-on bearing elements configured as arms 8 and 9 which, starting from the bearing block 3, extend out towards the engagement opening of clamp arms 5 and 6.

In their normal position these bearing arms rest on plate-like heads 10 which are attached to pegs 11 also immovably fixed to the star wheel 1, in such a way that the clamps 2 are held beneath the dish of the star wheel.

To be able to exchange the clamps, the two arms 8 and 9 just need to be squeezed together to allow the clamp to be pulled downwards off the pivot 4.

Figure 2:
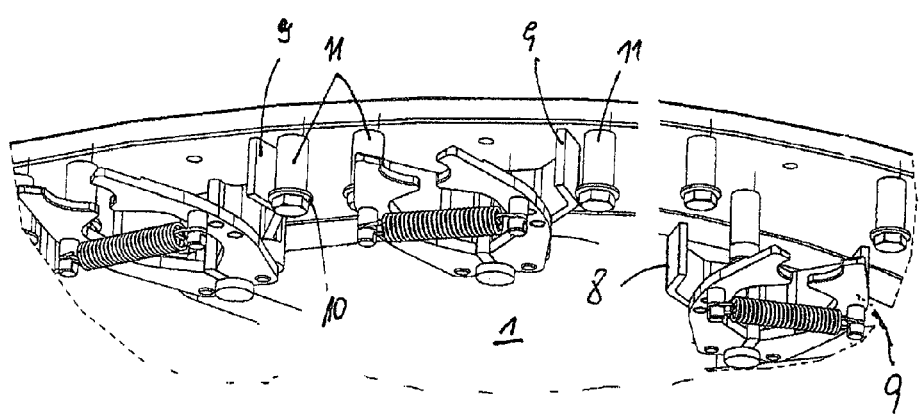
Figure 3:
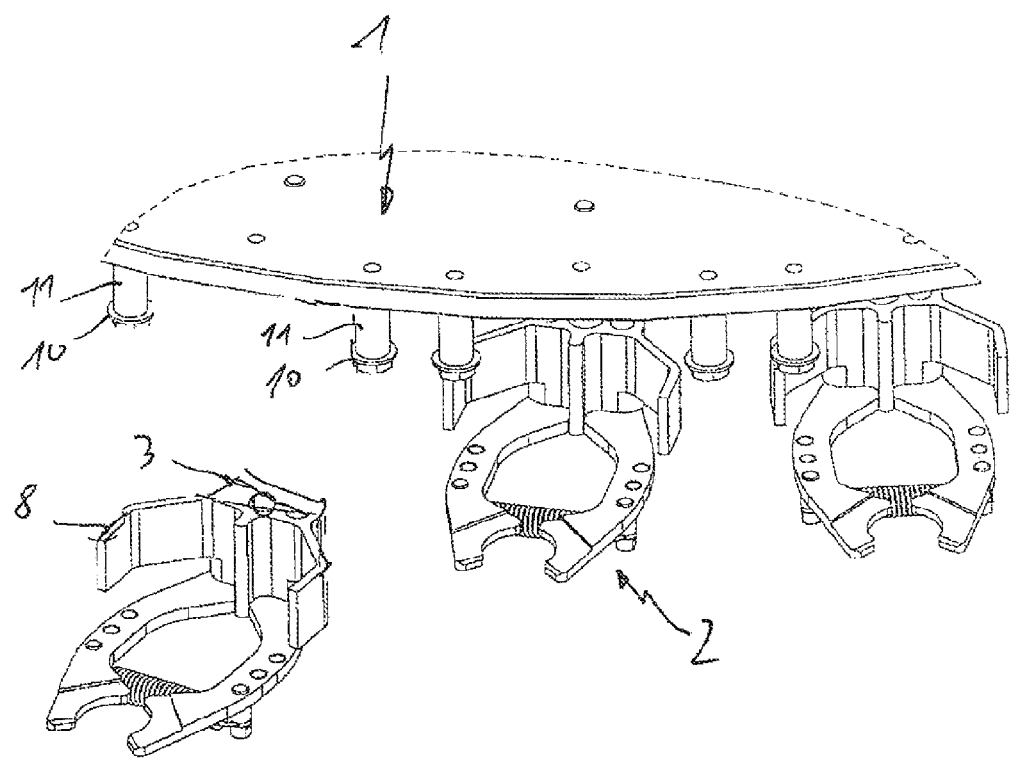

This type of mounting is used by the invention to effect an automatic release of a clamp from the star wheel 1 if a certain force acting on the clamp 2 concerned is exceeded. As shown for example in FIG. 1, the free ends 8a and 9a of arms 8 and 9 initially rest on the holding lips 10 of the holding pegs 11 concerned, and hold the clamp 2 in position. If a force is now applied say in the direction of the arrow 12 in FIG. 1 to the clamp 2, it rotates on the pivot 4 such that the free end 8a of the arm 8 initially parts from the holding lip 10, while the free end 9a of the opposite arm 9 is still in contact with the allocated holding lip 10. Continuing to apply the force will result in the right-hand position in FIG. 1 of the clamp concerned, i.e. both free ends 8a and 9a of the arms 8 and 9 part from the holding lip 10 by sliding past the allocated peg 11, thereby releasing the clamp, including bearing block, to fall away, as indicated in FIGS. 2 and 3.

The described embodiment of the invention can of course be modified in many different respects without departing from the basic idea. Thus the invention is in particular not confined to a certain form of the clamp 2, and in particular not confined to whether the latter is equipped with springs or can exert the clamping force solely by virtue of its own elasticity, the manner of the fixing 11 and the form of the corresponding lips 10 to retain the free ends 8a and 9a of the arms 8 and 9 can be designed differently, say as lips moulded on to the peg in a single piece and more suchlike.

The invention claimed is:

1. In a container filling installation, an apparatus for receiving a neck of a container, said apparatus comprising:
   a container clamp or container clip mounted on a conveying element, the container clamp or container clip including:
      a bearing block held on an underside of the conveying element on a bearing and holding device provided thereon, the bearing block having holding elements that detach at least partially from the bearing and holding device when at least one of a lateral pivoting range and a lateral force is exceeded, whereby at least one of the bearing block and the container clamp or container clip is released to fall toward the ground.

2. The apparatus of claim 1, wherein the bearing and holding device comprises at least one bearing element and at least two holding elements.

3. The apparatus of claim 2, wherein at least one bearing element and at least one holding element are designed in the shape of lips.

4. The apparatus of claim 2, wherein the bearing element of the bearing block is configured as a bayonet fitting.

5. The apparatus of claim 1,
   wherein the bearing block comprises moulded-on arms, each of which is retained by a holding lip on a peg, and
   wherein when a lateral pivoting range is exceeded, the moulded-on arms release the bearing block to fall free from the peg.

6. The apparatus of claim 5, wherein the moulded-on arms comprise a weakening at a predetermined break point such that when a lateral pivoting range is exceeded, the moulded-on arms bend back over the predetermined break point by elastic deformation and release the bearing block to fall free from the peg.

7. The apparatus of claim 5, wherein the length at least of the arm that is in front in a direction of motion of the conveying element is dimensioned so that when a lateral pressure is applied, the arm slides past the peg with the holding lip and springs off the peg to release the bearing block.

8. The apparatus of claim 5, wherein both arms have a length that allows the arms to spring off the peg.

9. The apparatus of claim 5, wherein the arms comprise an elastically flexible material.

10. The apparatus of claim 1, wherein the conveying element to which the container clamp or container clip is mounted comprises a container handling machine.

11. The apparatus of claim 10, wherein the container handling machine comprises a filling machine.

12. The apparatus of claim 1, wherein at least one bearing element and at least one holding element are designed in the shape of pegs.

13. The apparatus of claim 5, wherein the moulded-on arms snap off to release the bearing block.

14. The apparatus of claim 5, wherein the moulded-on arms bend back through elastic deformation to release the bearing block.

15. The apparatus of claim 6, wherein the weakening comprises a notch.

16. The apparatus of claim 1, wherein the conveying element to which the container clamp or container clip is mounted comprises a belt.

17. The apparatus of claim 1, wherein the conveying element to which the container clamp or container clip is mounted comprises a transport star.

* * * * *